BEST AVAILABLE COPY

2 Sheets—Sheet 1.

C. C. JAMES.

Grain-Drill.

No. 228. A. I. Patented Apr. 5, 1859.

N. PETERS, PHOTO-LITHOGRAPHER, WASHINGTON, D. C.

222. DISPENSING.

270

BEST AVAILABLE COPY

2 Sheets—Sheet 2.

C. C. JAMES.

Grain-Drill

No. 228. A. I. Patented Apr. 5, 1859.

N. PETERS, PHOTO-LITHOGRAPHER, WASHINGTON, D. C.

222. DISPENSING.
270

BEST AVAILABLE COPY

UNITED STATES PATENT OFFICE.

C. C. JAMES, OF DAYTON, OHIO.

IMPROVEMENT IN SEEDING-MACHINES.

Specification forming part of Letters Patent No. 18,552, dated December 15, 1857; Additional Improvement No. 228, dated April 5, 1859.

*To all whom it may concern:*

Be it known that I, CHARLES COX JAMES, of Dayton, Montgomery county, Ohio, have invented certain new and useful Improvements in Seeding-Machines additional to those for which Letters Patent were issued to me on 15th December, 1857; and I do hereby declare the following to be a full and exact description of the said additional improvements, reference being had to the accompanying drawings, making part of this specification.

The object of the present improvements is to still further insure a uniform and effective delivery of the grain.

Figure 1:
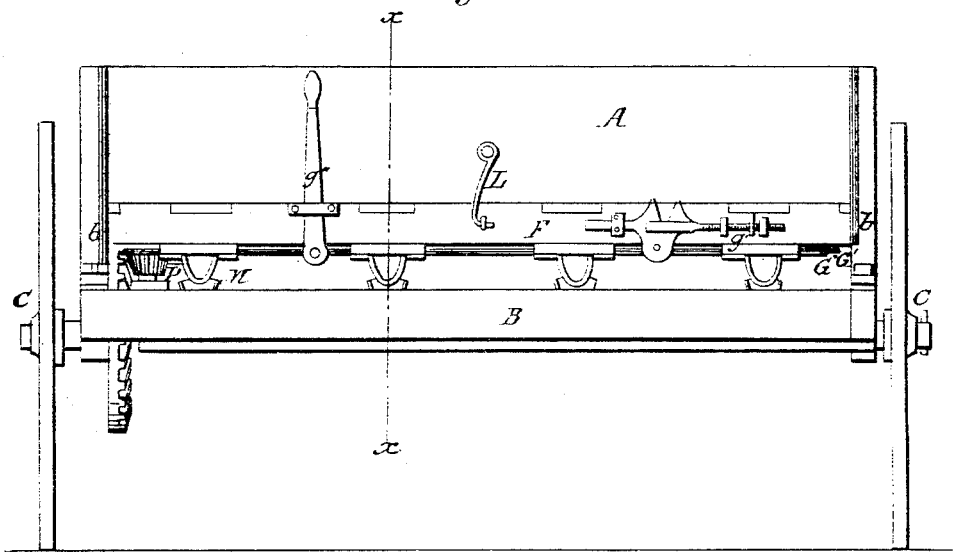
Figure 3:
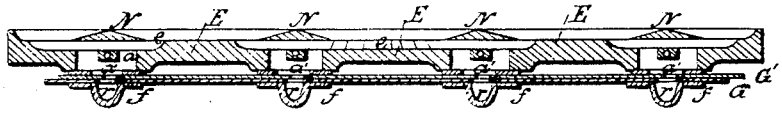
Figure 2:
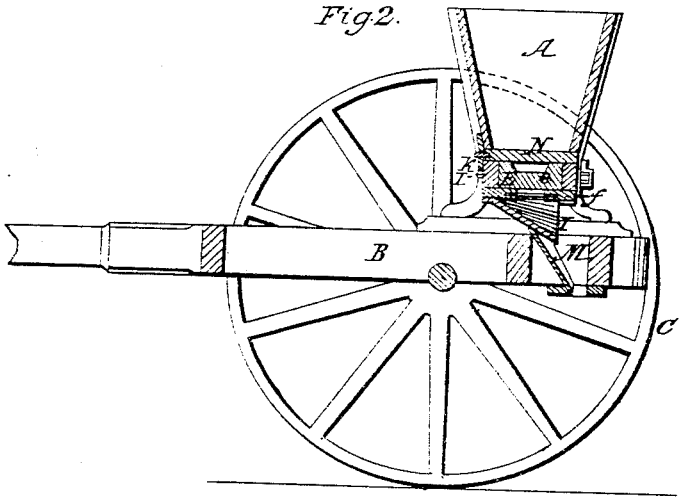
Figure 4:
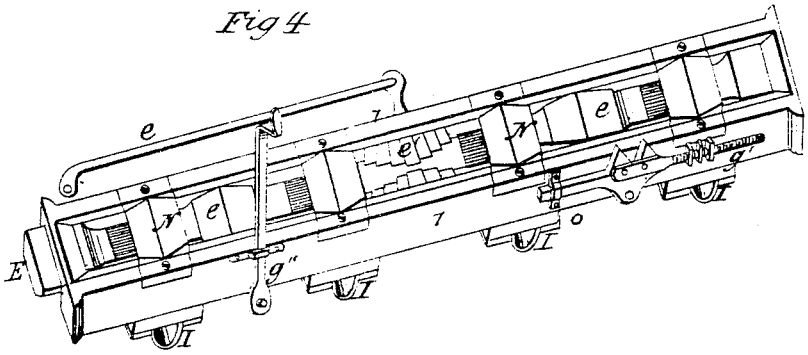

In the accompanying drawings, Figure 1 is a rear elevation of the improved machine. Fig. 2 is a transverse section at *x x*, Fig. 1. Fig. 3 is a vertical longitudinal section of the seed-delivering apparatus, and Fig. 4 a perspective view of the same as detached from the machine.

The hopper A, frame B, and wheel C are substantially similar to those described in my original patent above referred to.

Beneath the hopper A is a rectangular trough, F, open above and below, and supported at its ends in grooves *b*, the intermediate portion being held by ears K, hooks L, or substantially equivalent devices. The sides of the trough F are chamfered inwardly at their upper margins, and at their lower part are rabbeted to receive the agitator or seeding-slide E, which is supported by transverse bars *f*, fastened to the bottom of the trough and corresponding in number and position with the seed-apertures *a* of the slide. The bars *f* are slotted horizontally to enable them collectively to hold and guide a pair of graduating and cut-off slides, G′ G″, of any approved form, one of which may be operated by set-screws *g′* and the other by a lever, *g″*. Each bar *f* is pierced vertically by a central aperture, *a′*, from which a shoe, I, conducts to the spout M, which spout leads to the customary tube. The shoes I are made in funnel form, so as to gather the descending grain into a compact and uniform stream. These shoes may be either stationary, as in the present illustration, or movable, as in the original portion of my patent. At regular intervals, immediately over the bars *f*, the top of the trough F is crossed by roof-like bars N, which I term "screens." It will thus be seen that at mid-stroke the slide-apertures *a* are immediately above the apertures *a′* in the bars *f* and beneath the screens N.

The portions of the top surface of the slide between the apertures *a* may rise by sloping steps *e* to central ridges flush with the upper margin of the slide, thus placing each aperture at the center of a shallow sink or depression in the top of the slide. Another arrangement for assisting the forwarding of grain to the apertures is exhibited at *e′* in Fig. 4. In this case the grain-space on top of the slide is made to diminish in width by lateral sloping projections *e′* from the sides of the slide, which nearly or quite meet in the center at the mid-space between the apertures *a*. Each slide-aperture *a* is bisected by a bar or "septum," O, which at the top is level with the inner margin of the aperture *a*, and at bottom is sufficiently elevated above the bars *f* to avoid bruising the grain.

The stationary roof-like screen N serves to divert to the surface any trash which may be mingled with the grain, and also to sustain the grain and govern its descent into the slide-aperture without obstructing its flow, thus rendering the discharge as free when the hopper is full as when nearly empty. By the same means, also, the body of the grain is kept open and individual grains disposed into a horizontal position, so as to prevent packing, choking, or bunching. This is of especial importance in the case of such grain as oats or barley, and is further promoted by the action of the elevated cross-bar or septum O, which bisects the slide-aperture *a*, thereby tending to open and distribute the stream of grain. The effect of the inclined lateral projections *e′* is to suddenly create a vacancy, so as to open the body of grain at the proper moment for its discharge through the slide-apertures *a*.

The slides E G′ G″ and their confining sheath or case F *f* form collectively a distinct member, called by me "the seed-delivering apparatus." By simply casting off the connecting-rod Q from the pinion P, or otherwise disconnecting the slide from the actuating mechanism and withdrawing the hooks L this seed-delivering apparatus may be readily detached

BEST AVAILABLE COPY from the less destructible portion of the machine to protect it from exposure or for inspection, cleansing, or repair when needful.

What I claim as new, and desire to secure by Letters Patent, is—

The arrangement of the stationary roof-like screen N, lateral sloping projections *e'*, septum O, slides G' and G'', slotted bars *f*, and shoes I I with slide E and trough F, the above parts being constructed substantially as described and used in combination with the features covered by my patent of December 15, 1857.

In testimony of which invention I hereunto set my hand.

CHAS. COX JAMES.

Witnesses:
GEO. H. KNIGHT,
C. STEEMER.